(12) United States Patent
Shaharabany et al.

(10) Patent No.: US 10,282,097 B2
(45) Date of Patent: May 7, 2019

(54) STORAGE SYSTEM AND METHOD FOR THIN PROVISIONING

(71) Applicant: Western Digital Technologies, Inc., Irvine, CA (US)

(72) Inventors: Amir Shaharabany, Kochav Yair (IL); Michael Zaidman, Modiin (IL); Rotem Sela, Haifa (IL); Hadas Oshinsky, Kfar Saba (IL)

(73) Assignee: Western Digital Technologies, Inc., San Jose, CA (US)

( * ) Notice: Subject to any disclaimer, the term of this patent is extended or adjusted under 35 U.S.C. 154(b) by 20 days.

(21) Appl. No.: 15/476,626

(22) Filed: Mar. 31, 2017

(65) Prior Publication Data

US 2018/0188998 A1   Jul. 5, 2018

Related U.S. Application Data

(60) Provisional application No. 62/442,801, filed on Jan. 5, 2017.

(51) Int. Cl.
*G06F 3/06* (2006.01)
*G06F 12/02* (2006.01)
*G06F 12/08* (2016.01)

(52) U.S. Cl.
CPC .......... *G06F 3/0608* (2013.01); *G06F 3/0605* (2013.01); *G06F 3/0631* (2013.01); *G06F 3/0685* (2013.01); *G06F 3/0688* (2013.01); *G06F 12/0246* (2013.01); *G06F 12/08* (2013.01); *G06F 2212/7201* (2013.01)

(58) Field of Classification Search
CPC .... G06F 3/0659; G06F 3/0604; G06F 3/0653; G06F 3/0679; G06F 3/0665; G06F 3/0607; G06F 3/0608; G06F 3/061; G06F 3/0626; G06F 3/0629; G06F 3/0631;
(Continued)

(56) References Cited

U.S. PATENT DOCUMENTS 6,681,305 B1    1/2004  Franke et al.
9,606,909 B1 *  3/2017  Vincent
(Continued)

OTHER PUBLICATIONS

International Search Report and Written Opinion in corresponding International Application No. PCT/US2017/063642, dated Feb. 13, 2018, 15 pages.

*Primary Examiner* — Michael Krofcheck
(74) *Attorney, Agent, or Firm* — Morgan, Lewis & Bockius LLP

(57) ABSTRACT

A storage system and method for thin provisioning are provided. In one embodiment, a storage system is provided comprising a memory and a controller. The controller is configured to provide a logical exported capacity of the memory to a host, wherein the logical exported capacity is greater than an actual storage capacity of the memory; receive a command from the host to write data to a logical address; determine whether there is available actual storage capacity in the memory to write the data; and write the data to a physical address in memory that corresponds to the logical address only if it is determined that there is available actual storage capacity in the memory to write the data. Other embodiments are possible, and each of the embodiments can be used alone or together in combination.

19 Claims, 8 Drawing Sheets

(58) Field of Classification Search
CPC ...... G06F 3/0655; G06F 3/067; G06F 3/0688; G06F 12/0246; G06F 12/0238
See application file for complete search history.

(56) References Cited

U.S. PATENT DOCUMENTS

| | | | |
|---|---|---|---|
| 9,767,111 B1* | 9/2017 | Natanzon | G06F 17/30138 |
| 2003/0065866 A1 | 4/2003 | Spencer | |
| 2005/0188176 A1 | 8/2005 | Chiang et al. | |
| 2008/0034175 A1* | 2/2008 | Traister | G06F 12/0246 |
| | | | 711/159 |
| 2012/0173838 A1* | 7/2012 | Noll | G06F 3/0605 |
| | | | 711/170 |
| 2013/0212317 A1 | 8/2013 | Traister et al. | |
| 2015/0067281 A1* | 3/2015 | Jones | G06F 12/0284 |
| | | | 711/156 |
| 2015/0347024 A1 | 12/2015 | Abali et al. | |
| 2016/0011811 A1* | 1/2016 | Garson | G06F 12/023 |
| | | | 711/154 |
| 2016/0139835 A1* | 5/2016 | Fiebrich-Kandler | |
| | | | G06F 3/0665 |
| | | | 711/114 |
| 2016/0284393 A1* | 9/2016 | Ramalingam | G11C 11/5628 |
| 2017/0185605 A1* | 6/2017 | Higuchi | G06F 17/30073 |

* cited by examiner

STORAGE SYSTEM AND METHOD FOR THIN PROVISIONING

CROSS-REFERENCE TO RELATED APPLICATION

This application claims priority to U.S. Provisional Patent Application No. 62/442,801, filed on Jan. 5, 2017, which is hereby incorporated by reference herein.

BACKGROUND

When storing data in a storage system, a file system on a host can maintain a table of logical block addresses (LBAs) and send commands to the storage system to write data in an available LBA. The storage system can map the LBA received from the host to a physical address in memory and store the data therein. When writing one or more sequential streams of data, the host's file system can allocate a sequential set of available LBAs to each stream to store the stream's data. It is possible that the allocated sequential set of available LBAs will not be large enough to store the stream of data. If the host's file system detects that the next LBA it needs to write the stream's data is outside of the allocated range (e.g., because the next LBA is occupied or is out of the storage system's capacity), the host's file system can perform a host-side garbage collection operation by sending move commands to the storage system to generate free LBAs to continue the sequential write operation.

DETAILED DESCRIPTION

Overview

Figure 1A:
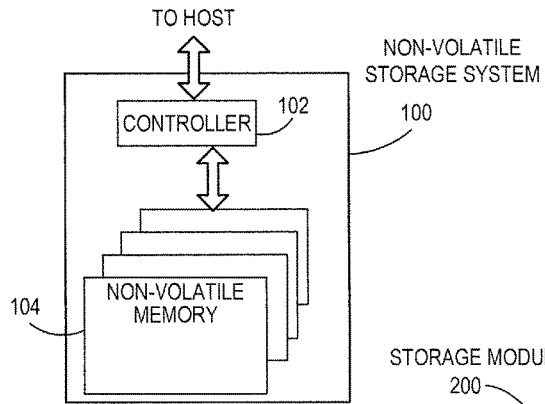
FIG. 1A is a block diagram of a non-volatile storage system of an embodiment.

By way of introduction, the below embodiments relate to a storage system and method for thin provisioning. In one embodiment, a storage system is provided comprising a memory and a controller. The controller is configured to provide a logical exported capacity of the memory to a host, wherein the logical exported capacity is greater than an actual storage capacity of the memory; receive a command from the host to write data to a logical address; determine whether there is available actual storage capacity in the memory to write the data; and write the data to a physical address in memory that corresponds to the logical address only if it is determined that there is available actual storage capacity in the memory to write the data.

In some embodiments, the controller is configured to determine whether there is available actual storage capacity in the memory by determining whether or not a storage valid count of the memory after the data is written would exceed the actual storage capacity of the memory.

In some embodiments, the controller is further configured to determine whether the command is an overwrite command, and wherein the controller is configured to determine whether there is available actual storage capacity in the memory after determining that the command is not an overwrite command.

In some embodiments, the controller is further configured to determine whether a sum of the logical address and size of the data is greater than the logical exported capacity, and wherein the controller is configured to determine whether there is available actual storage capacity in the memory to write the data after determining that the sum is not greater than the logical exported capacity.

In some embodiments, the controller is further configured to receive a discard command from the host and decrease a storage valid count of the memory in response to the discard command.

In some embodiments, the data is part of a stream.

In some embodiments, the memory comprises a three-dimensional memory.

In some embodiments, the storage system is embedded in the host.

In some embodiments, the storage system is removably connected to the host.

In another embodiment, a method of writing data to a thin-provisioned storage system is provided. The method comprises determining whether a valid data size of the memory would be greater than the actual storage capacity of the memory if data were to be written to an available logical block address of the memory; and in response to determining that the valid data size of the memory would not be greater than the actual storage capacity of the memory, sending a command to the storage system to write the data to the logical address.

In some embodiments, the storage system tracks the valid data size of the memory, and wherein the method further comprises receiving the valid data size of the memory from the storage system.

In some embodiments, the host tracks the valid data size of the memory of the storage system.

In some embodiments, the method further comprises determining whether the command is an overwrite command, and wherein determining whether the valid data size of the memory would be greater than the actual storage capacity of the memory is performed in response to the command not being an overwrite command.

In some embodiments, the method further comprises decreasing a valid data size of the memory in response to a discard command.

In some embodiments, the data is part of a stream.

In some embodiments, the memory in the storage system comprises a three-dimensional memory.

In some embodiments, the storage system is embedded in the host.

In some embodiments, the storage system is removably connected to the host.

In another embodiment, a storage system is provided comprising a memory; means for providing a logical exported capacity of the memory to a host, wherein the logical exported capacity is greater than an actual storage capacity of the memory; means for receiving a command from the host to write data to a logical address; means for determining whether there is available actual storage capacity in the memory to write the data; and means for writing the data to a physical address in memory that corresponds to the logical address only if it is determined that there is available actual storage capacity in the memory to write the data.

In some embodiments, the memory in the storage system comprises a three-dimensional memory.

In some embodiments, the storage system is embedded in the host.

In some embodiments, the storage system is removably connected to the host.

Other embodiments are possible, and each of the embodiments can be used alone or together in combination. Accordingly, various embodiments will now be described with reference to the attached drawings.

Exemplary Embodiments

Figure 1B:
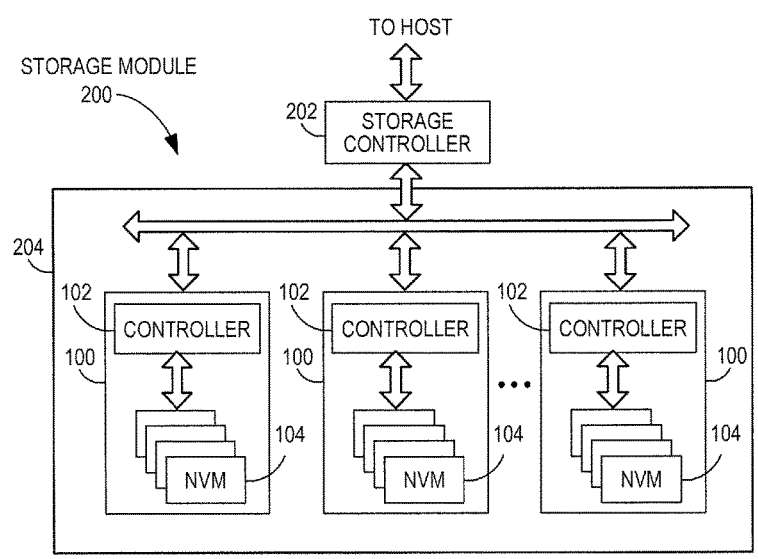
FIG. 1B is a block diagram illustrating an exemplary storage module of an embodiment.
Figure 1C:
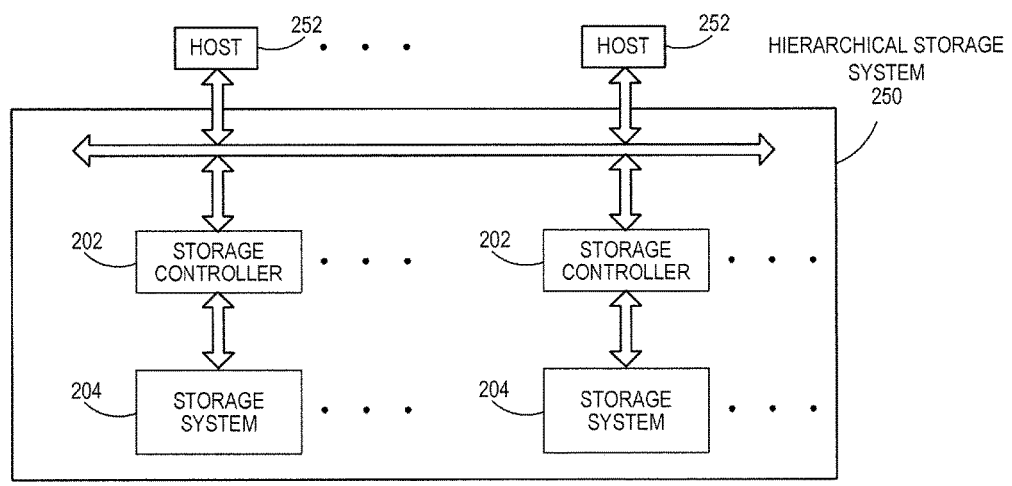
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some NAND storage system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

In one embodiment, the host 252 comprises a controller and a memory. The host's controller can execute software or firmware to implement and run a file system, such as a log-structured file system (e.g., a file system in which data/metdata are written sequentially to a circular buffer (log)). Alternatively, the file system can be implemented purely in hardware on the host 252. The file system can send read and/or write commands to the storage system 100 in accordance with one or more applications running on the host 252. As will be discussed further below, the host's file system can operate in the logical block address (LBA) space. Also, while certain actions will be described below as being performed by the host's file system, it should be understood that these actions can be performed by any suitable component in the host 252—not necessarily by the file system. Accordingly, "file system" should not be read into the claims when the claims just use the term "host."

Figure 2A:
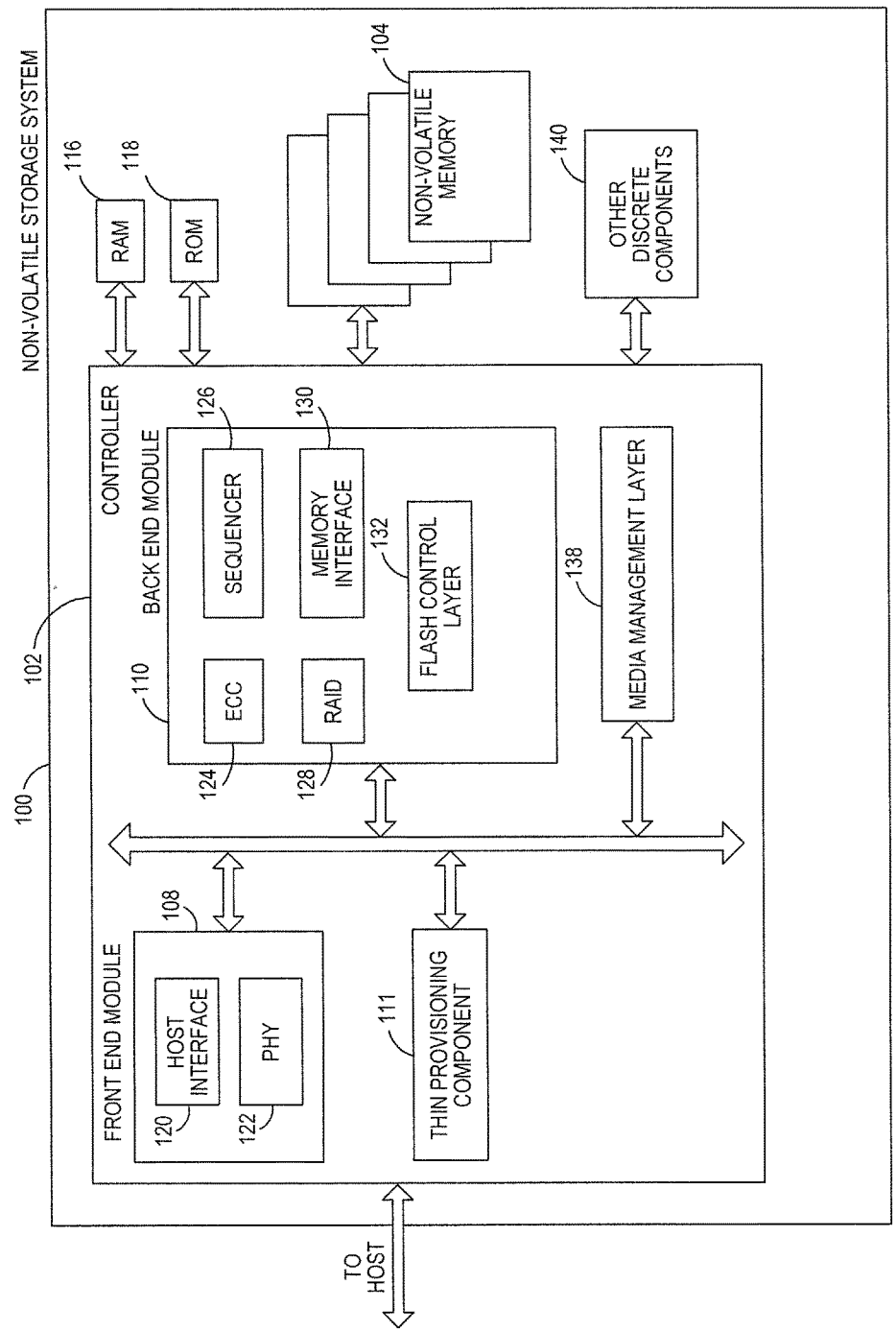
FIG. 2A is a block diagram illustrating exemplary components of the controller of the non-volatile storage system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. Modules of the controller 102 may include a thin provisioning component 111 that is configured to export a larger logical capacity of the memory 104 to the host 252 and ensure that writes from the host 252 do not exceed the actual storage capacity of the memory 104. The thin provisioning component 111 will be discussed in more detail below, and, in one embodiment, is implemented as software or firmware in the controller 102. It should be noted, though, that a module, circuit, or monitor may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
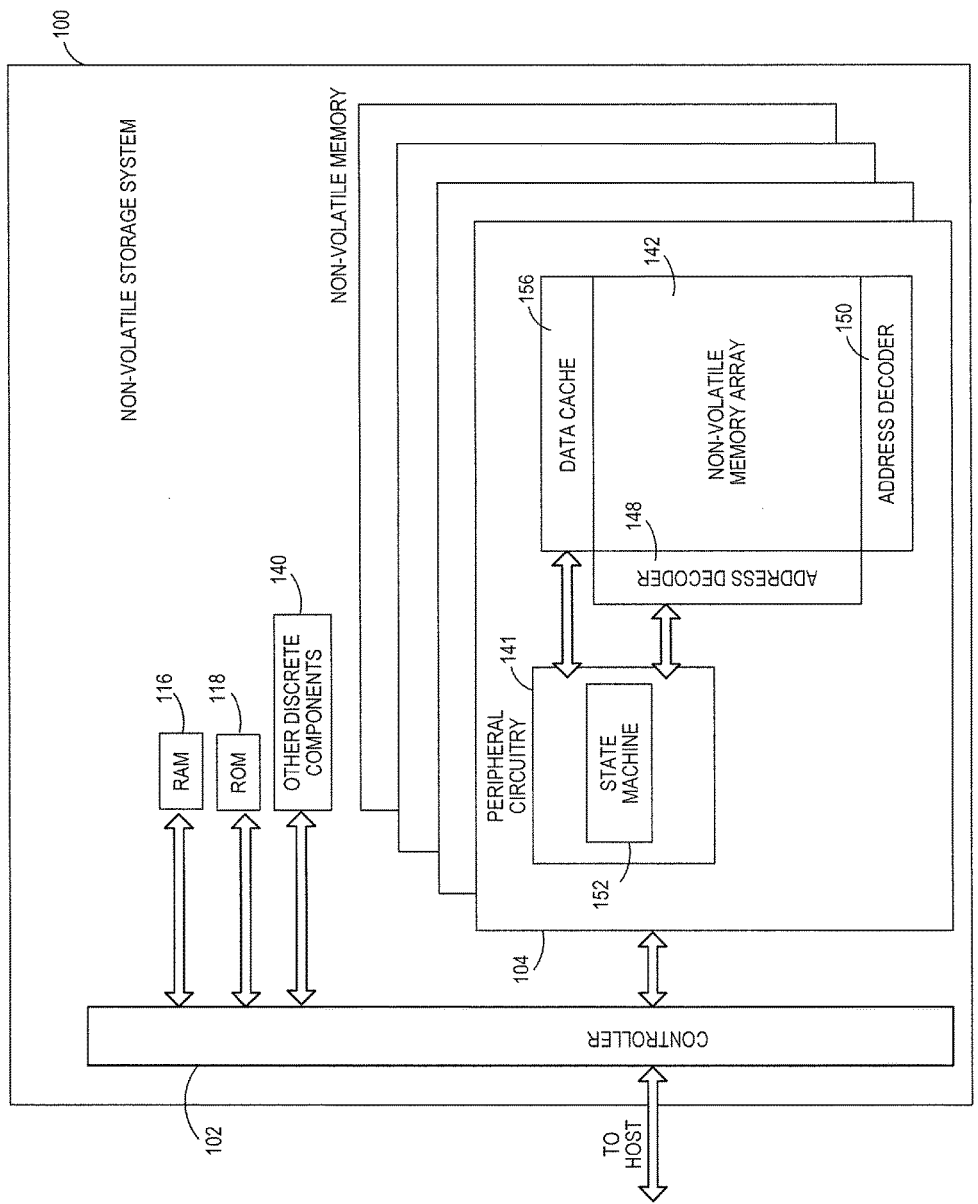
FIG. 2B is a block diagram illustrating exemplary components of the non-volatile memory storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102.

As noted above, when storing data in the storage system 100, a file system on the host 252 can maintain a table of logical block addresses (LBAs) to manage files over the LBA space and send commands to the storage system 100 to write data to a certain LBA. The storage system 100 can convert the LBA received from the host 252 to a physical address in memory 104 and store the data therein. The host's file system can handle several open sequential streams in the direction of the storage system 100. Each open stream needs an overprovisioned LBA range for a continuous, sequential write. The host's file system can initiate a defrag/garbage collection operation to free sequential blocks in order to perform continuous, sequential writes to the open streams, as a defrag/garbage collection operation is needed due to the lack of ordered free LBA blocks in the LBA space. The defrag/garbage collection operation can be performed with copy operations to the storage system 100 to read and write data to different LBAs, or a move command can be used. When the valid data size (fill level) in the storage system 100 is close to the storage system's exported capacity, the defrag/garbage collection operation in the LBA space can become difficult, as many move operations may be required to clear a sequential block in the LBA space. This increases the write amplification of the storage system 100.

The inventors have recognized that these difficulties are due in part to the fact that prior storage systems support an LBA range that is nearly 1:1 to the physical storage size (in many cases, prior storage systems actually support a smaller LBA range than the physical storage array size). The following embodiments break the correlation between LBA space and available physical space in the memory 104 of the storage system 100 by making the LBA space exported to the host 252 larger than the physical storage space of the memory 104. This concept of "thin provisioning" allows the storage system 100 to support an LBA range that is over the size of the memory's physical size, meaning that the addressing of a logical space will allow crossing the physical addressing size boundary. In this addressing schema, some LBAs are addressed to a pointer that is bigger than the physical exported capacity. Thin provisioning allows a log-structured file system to write sequential streams until the LBA space is out of range as before, but now the LBA space is bigger than the physical space. The larger LBA space can result in fewer defrag/garbage collection operations by the host 252 (the storage system 100 can perform its own garbage collection operations internally according to its own geometry (block size) constraints).

While having a greater exported logical capacity allows more LBAs to be allocated without garbage collection, the actual storage capacity of the memory 104 is a limitation. Several mechanisms can be used to ensure that more data isn't written to the memory 104 than the memory 104 can physically store. That is, the storage system 100 can support an extended LBA range, but the storage system 100 and/or the host 252 can ensure that the write workloads to the memory 104 are not bigger than the physical capacity of the memory 104 (i.e., writing to LBAs out of the physical LBA range can be supported if the total amount of valid LBAs is less than the physical capacity of the memory 104). So, in one embodiment, the extended LBA capacity of the storage system 100 is unknown to the host 252 until the valid data size (fill level) of the storage system 100 is at the storage system's exported capacity, in which case, it can be made transparent to the host's file system that the storage system 100 has been thin provisioned. As mentioned above, the storage system 100 and/or the host 252 can be used to make sure the memory 104 isn't overwritten. In embodiments where both the storage system 100 and host 252 are used, the extra management overhead of thin provisioning can be shared.

In general, with these embodiments, the storage system 100 declares a physical exported capacity according to the memory's physical storage system (e.g., 32 GB) and declares a logical exported capacity according to translation layer addressing (e.g., thin provisioning of 50% would result in a logical exported capacity of 48 GB for 32 GB of physical capacity). The physical exported capacity is declared as the current known exported capacity. The physical exported capacity can be aligned with the physical capacity. For example, a 32 GB device can declare 32*1000*1000*1000/4096*0.93=7000000, where 32*1000*1000*1000 is 32 GB in bytes. Dividing by 4096 for addressing data of 4 KB data size addressing, 0.93 is the factor of the capacity reducing internal tables for the flash management.

The logical exported capacity is declared as the LBA range that the storage system 100 supports. (The logical exported capacity can be provided to the host in a message at any appropriate time, such as when the storage system 100 is connected with the host 252.) This logical exported capacity is number of the LBAs that define the physical capacity+LBA overprovisioning. Any suitable overprovision percentage size can be used. In the above example, the overprovision percentage was 50%, but it should be understood that any suitable percentage (e.g., 1% to 100%) can be used. 50% overprovisioning is 7000000*0.5 which is 3500000. Therefore, the logical exported capacity is 7000000+3500000=10500000 LBA's. The host 252 may use any LBA address between 0 and 10500000 to write and read, and the storage system 100 can authorize any address in that range.

The translation layer (LBA to physical location) can be done according to logical exported capacity. The storage system 100 can maintain a translation layer from LBA to physical address in the storage array where the table size is according to logical exported capacity. The translation layer can be updated on write operations and be used in internal garbage collection and host read operations. Therefore, one embodiment supports the entire logical exported capacity size. In the above example, the translation layer table size comprises 10500000 entries, and if each entry size 4 bytes, the size is 42000000 bytes. The translation layer without thin provisioning is the physical exported capacity, which is 7000000*4=35000000 bytes. Setting up the internal table size with the thin provisioning requires bigger tables and bigger physical storage dedicated to management (the table in the nonvolatile memory 104), but, in one embodiment, it is a small portion, about $\frac{1}{1000}$ of the overprovisioning size.

In one embodiment, the host's file system would handle the LBA space according to the logical exported capacity of the memory 104, and the storage device 100 would allow write commands for LBAs up to the logical exported capacity but would deny those commands when the valid data size reaches the physical exported capacity. That is, when the valid data size reaches the physical exported capacity, write commands from the host can be denied. As will be discussed in more detail below, the valid data size can be maintained by the storage system 100, by the host 252, or by the storage system 100 and shared with the host 252.

In one embodiment, the storage system 100 manages a valid LBA counter in the storage system 100. As the storage system 100 is eventually limited to the physical storage size of the memory 104, it cannot support a write request payload beyond a certain threshold that is associated with the physical memory storage. So, the storage system 100 can increase the valid count for an LBA write request and set the LBA as valid in the translation table. The storage system 100 can also decrease the valid count for an LBA discard request and set the LBA as invalid in the translation table. The storage system 100 can disregard the valid count for LBA write request, where the LBA is valid in the storage (overwrite) and can reject a write operation if the valid LBA counter is above the physical exported capacity. The storage system 100 can replay the valid LBA counter per host request.

As will be discussed below, the host 252 can configure its file system to use the logical exported capacity and can manage the LBA valid count by itself and not depend on the storage system 100 fail-on-write error to signal a problem. The host can also request the value of the valid LBA counter from the storage system 100 and manage its own request accordingly. As will also be discussed in more detail below, the host's file system can echo discard commands to the storage system 100 to prevent the valid data size from reaching the physical exported capacity prematurely (i.e., to avoid reaching the valid LBA counter to the physical limit).

Figure 3:
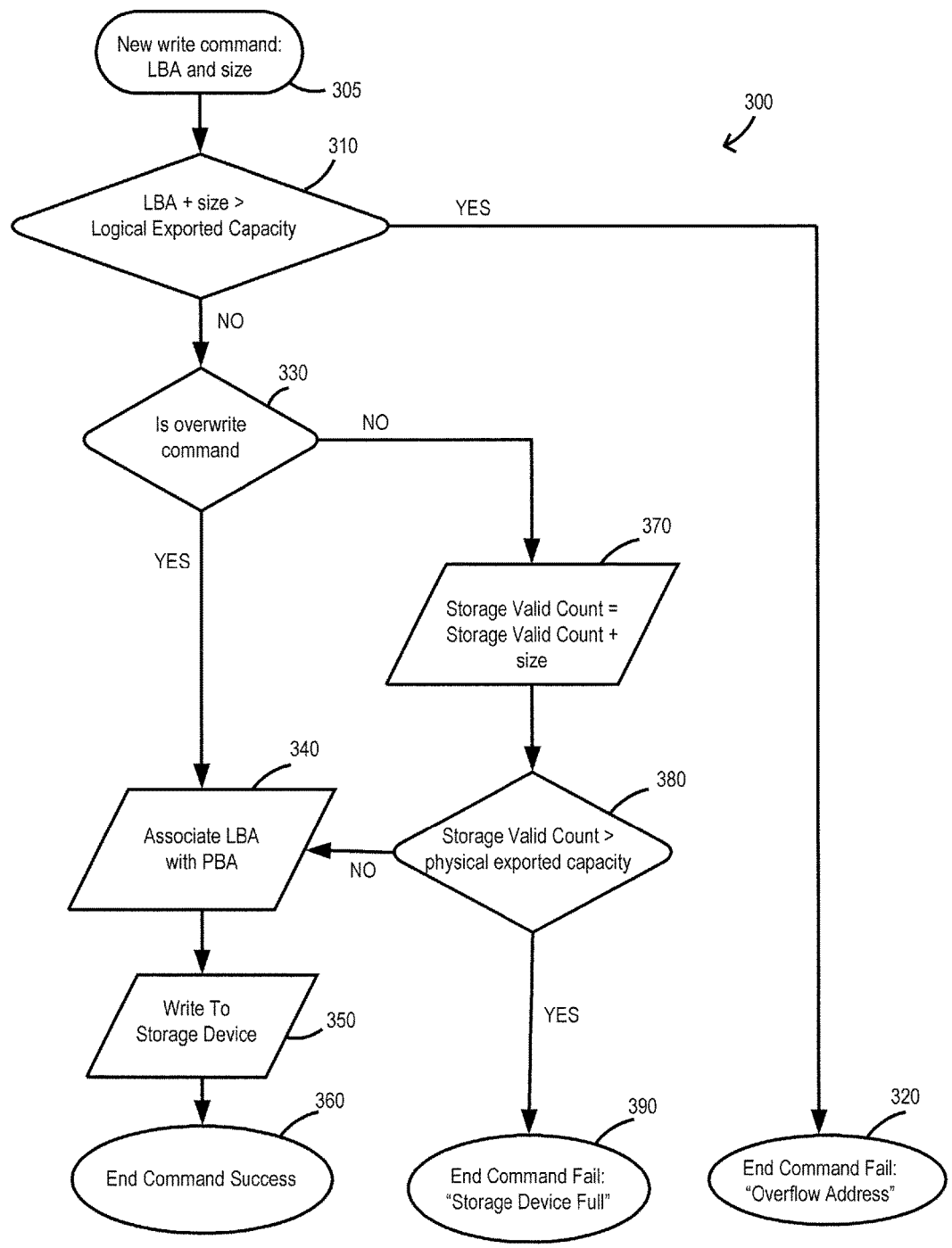
FIG. 3 is a flow chart of a method of an embodiment in which a thin-provisioned storage system keeps track of a storage valid count.

These embodiments will be discussed in more detail in conjunction with FIGS. 3-7. Turning first to FIG. 3, FIG. 3 is a flow chart 300 of a method of an embodiment in which a thin-provisioned storage system 100 keeps track of a storage valid count of the memory 104. As shown in FIG. 3, when the storage system 100 receives a new write command (specifying an LBA and size of the data to be written) from the host 252 (act 305), the storage system 100 determines if the number of LBAs encompassed by the specified LBA and size exceeds the exported logical capacity of the storage system 100 (act 310). If it does, the method ends with an "overflow address" failure (act 320). If the number of LBAs encompassed by the specified LBA and size does not exceed the exported logical capacity of the storage system 100, the storage system 100 then determines if the write command is an overwrite command (act 330). The storage system 100 can determine this either by a specific indication from the host 252 or by looking to see if the specified LBA range is not available (indicating that there is already data written in the specified LBA range), for example. Of course, other ways of determining whether the command is an overwrite command can be used.

If the command is an overwrite command, this means that the data to be written will not increase the amount of valid data stored in the storage system 100 (i.e., the "storage valid count" or the "valid data size") because it is overwriting data that has already been accounted for. So, there is no risk of exceeding the physical exported capacity of the storage system 100. As such, the storage system 100 can just map the LBA to a physical block address (PBA) (act 340) and write the data to the storage system 100 (act 350), which ends the method with a "command success" result (act 360).

If the command isn't an overwrite command, additional data is to be written to the storage system 100 and needs to be accounted for in the storage valid count. So, in this case, the storage system 100 would add the data size to the storage valid count (act 370) and then determine if the storage valid count is larger than the physical exported capacity of the storage system 100 (act 380). If it is, the method ends with a "storage device full" failure (act 390). If it isn't, the data is written, acts 340-360 are performed, as described above.

In the embodiment discussed in FIG. 3, the storage system 100 was responsible for keeping track of the storage valid count and determining whether a given write command from the host 252 should be executed. In alternate embodiments, the file system on the host 252 can perform some or all that responsibility. For example, in the flow chart 400 of FIG. 4, the storage system 100 still keeps track of the storage valid count, but the file system on the host 252 requests the storage valid count and determines whether or not to send a write command to the host 252 based on this information.

Figure 4:
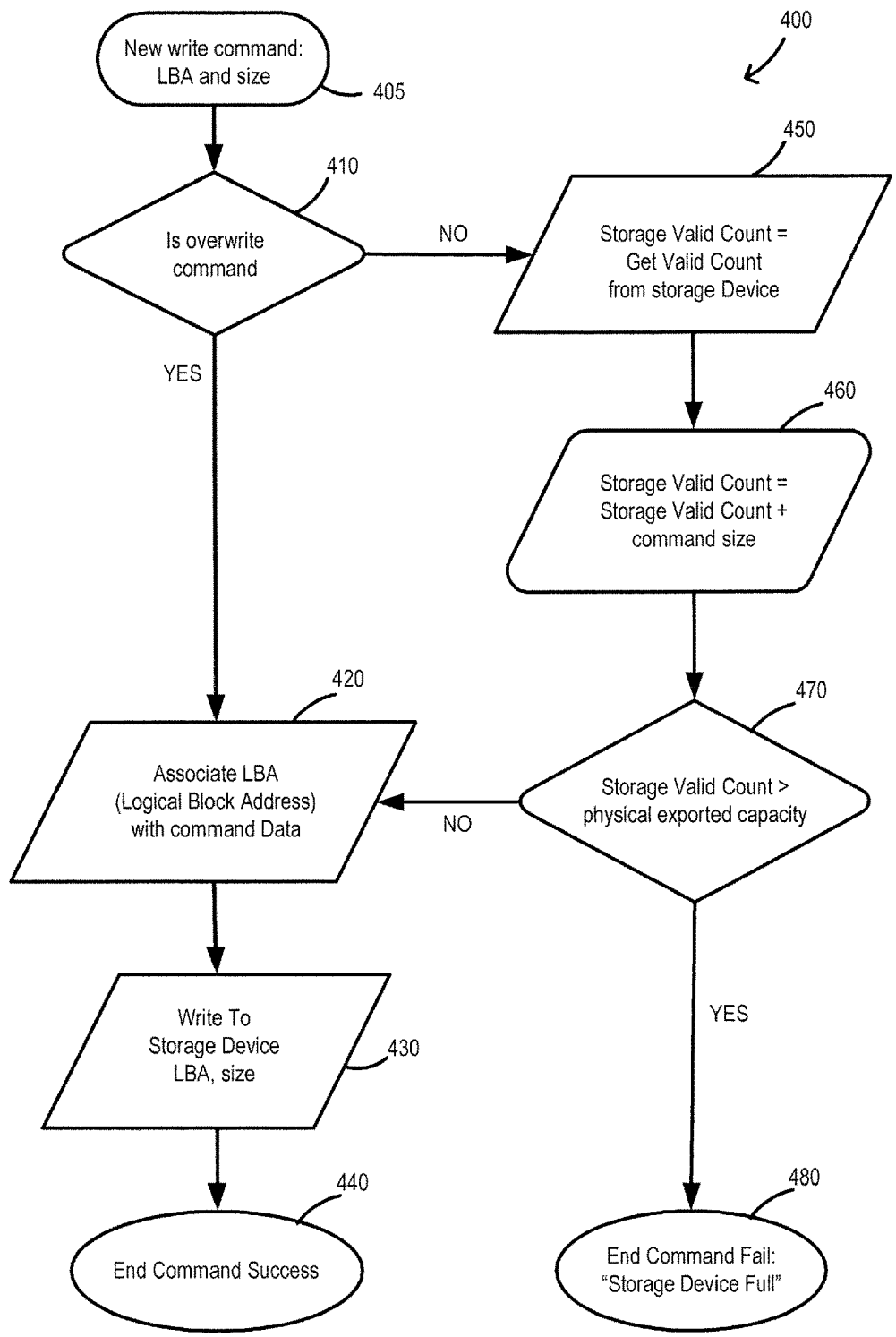
FIG. 4 is a flow chart of a method of an embodiment in which a file system on a host requests a storage valid count from a thin-provisioned storage system.

As shown in FIG. 4, when the file system on the host 252 has a write command to issue to the storage system 100 (act 405), the host 252 first determines whether the write command is an overwrite command (act 410). This determination can be made using any suitable method, some of which are discussed above. If the write command is an overwrite command, there is no impact on the storage valid count, so the host 252 can associate the LBA of the write command with data (act 420), send the command to the storage system 100 (act 430), and signal command success (act 440). If the write command is not an overwrite command, the file system on the host 252 requests the storage valid count from the storage system 100 (act 450). The host 252 then updates the storage valid count with the command size (act 460) and determines if the storage valid count is greater than the physical exported capacity of the storage system 100 (act 470). If it is, the method ends with a "storage device full" error (act 480). If it is not, the host 252 associates the LBA of the write command with data (act 420), sends the command to the storage system 100 (act 430), and signals command success (act 440).

Figure 5:
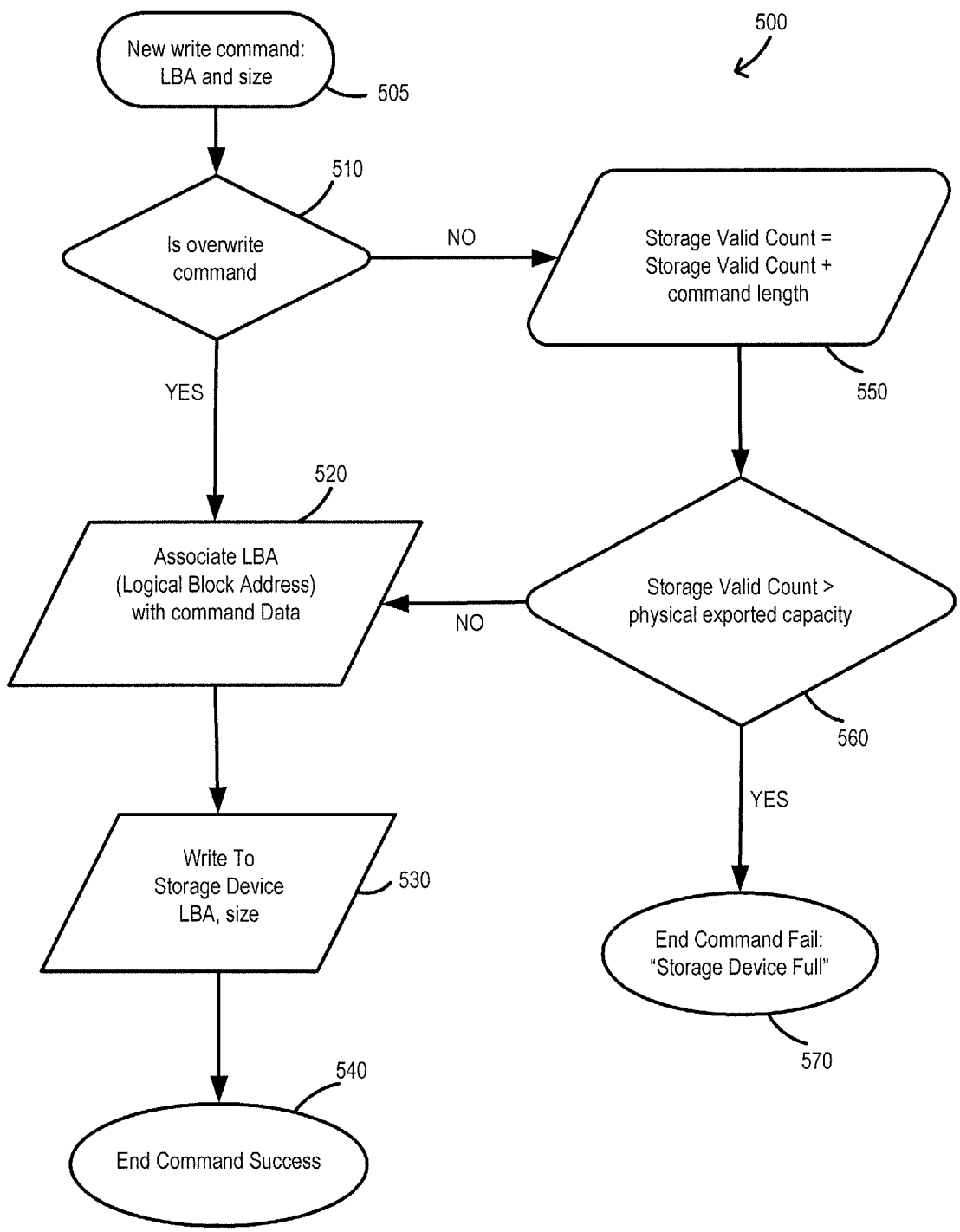
FIG. 5 is a flow chart of a method of an embodiment in which a file system on a host tracks a storage valid count of a thin-provisioned storage system.

While the flow chart 400 in FIG. 4 showed an approach that was distributed between the host 252 and the storage system 100, the flow chart 500 in FIG. 5 shows an approach that is performed by the host 252. As shown in FIG. 5, when the file system on the host 252 has a write command to issue to the storage system 100 (act 505), the host 252 first determines whether the write command is an overwrite command (act 510). This determination can be made using any suitable method, some of which are discussed above. If the write command is an overwrite command, there is no impact on the storage valid count, so the host 252 can associate the LBA of the write command with data (act 520), send the command to the storage system 100 (act 530), and signal command success (act 540). If the write command is not an overwrite command, the file system on the host 252 updates the storage valid count with the command size (act 550). Because the file system on the host 252 keeps track of the storage valid count, it does not need to request that information from the storage system 100, as if does in the method shown in FIG. 4. Next, the file system on the host 252 determines if the storage valid count is greater than the physical exported capacity of the storage system 100 (act 560). If it is, the method ends with a "storage device full" error (act 570). If it is not, the host 252 associates the LBA of the write command with data (act 520), sends the command to the storage system 100 (act 530), and signals command success (act 540).

Another embodiment deals with discard commands. When a file system on the host 252 wants to discard data, it can simply update its internal LBA table marking those LBAs as available. However, unless the host 252 informs the storage system 100 of the discard, the storage system 100 will still assume that valid data is being stored in those LBA. So, even though the host 252 thinks those LBAs are available, the storage system 100 will not. If the storage system 100 is keeping track of the storage valid count, this can result in the storage system 100 thinking that there isn't enough available storage space for a future write from the host 252 (resulting in a "storage device full" error) even though there may be space available to accept the write.

Figure 6:
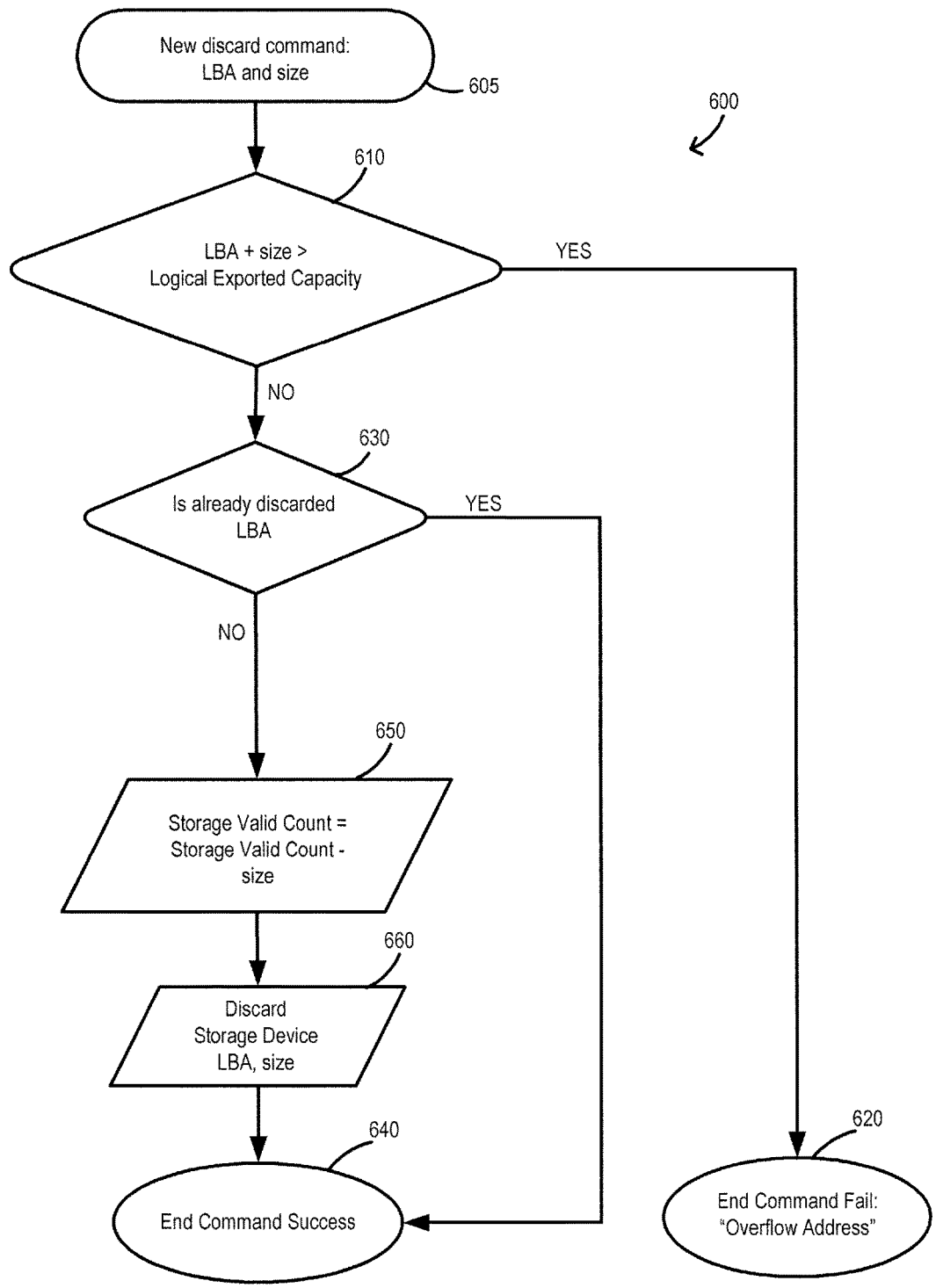
FIG. 6 is a flow chart of a method of an embodiment in which a thin-provisioned storage system keeps track of a storage valid count after executing a discard command from a host.

As shown in the flow chart 600 in FIG. 6, to account for this situation, the host 252 provides the storage system 100 with the discard command (act 605). The storage system 100 first checks to see if the LBA range that is requested to be discarded is more than the logical exported capacity of the storage system 100 (act 610). If it is, the storage system 100 indicates an "overflow address" command fail (act 620). If it isn't, the storage system 100 decides whether the LBA is already discarded (act 630). If the LBA has already been discarded, no updating is needed, that the method ends with a command success message (act 640). However, if the LBA has not already been discarded, the storage system 100 adds the size of the discard to the storage valid count (act 650) and executes the discard command (e.g., by updating the logical-to-physical address table(s) in the storage system 100 to show the LBA range as now being available) (act 660). The method then ends with a command success message (act 640).

Figure 7:
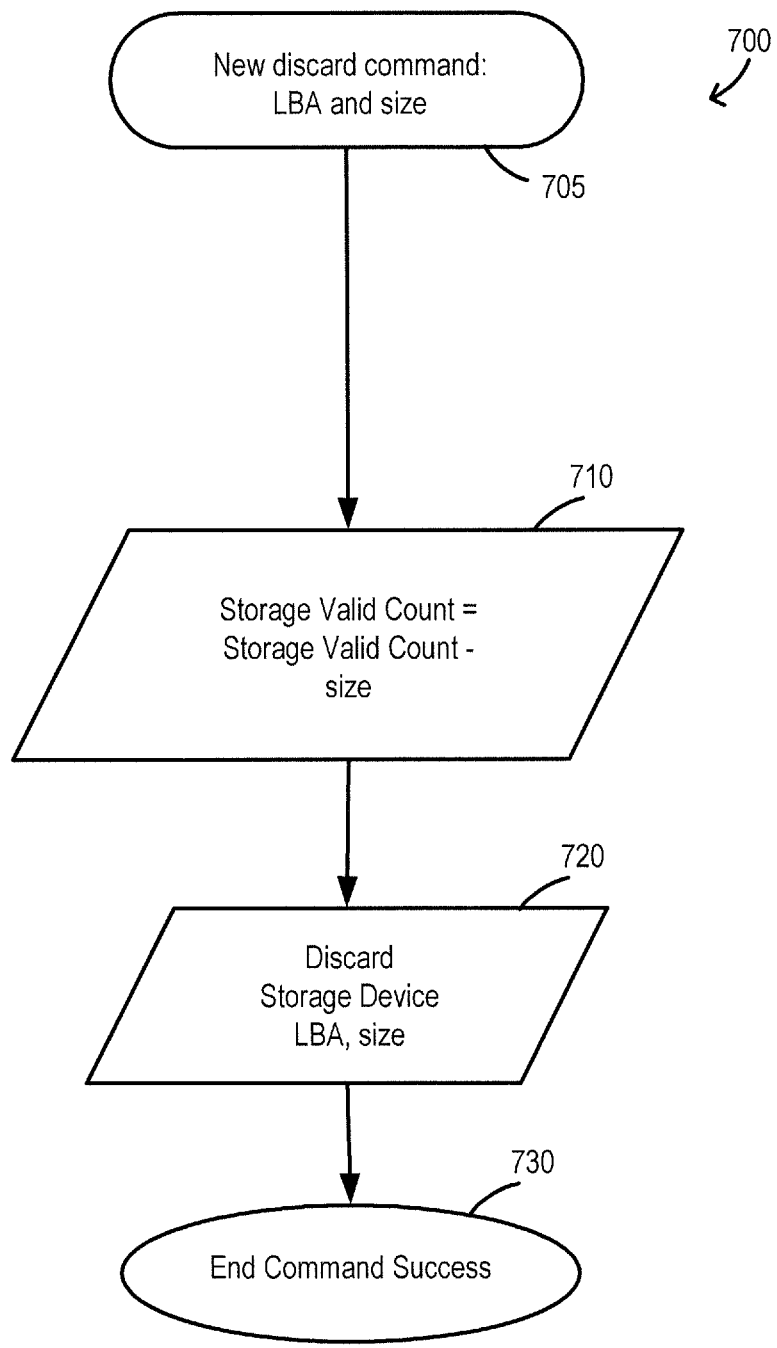
FIG. 7 is a flow chart of a method of an embodiment in which a file system on a host tracks a storage valid count of a thin-provisioned storage system after a discard command.

As shown in the flow chart 700 in FIG. 7, if the host 252 is keeping track of the storage valid count (exclusively or in conjunction with the storage system 100), when the host 252 has a discard command (act 705), the host 252 increase the storage valid count (act 710) when sending the discard command to the storage system 100 (act 720). The discard command can be sent before or after the updating. The method then ends with a command success message (act 730).

There are several advantages associated with these embodiments. For example, thin provisioning allows a log-structured file system to postpone the garbage collection operations, so such operations can be done less frequently than before. A garbage collection operation may eventually be needed to free an LBA range. However, with these embodiments, such garbage collection operations can operate on a smaller size than before as the thin provisioning helps ensure more amount of free space in total than before.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage system comprising:
a memory; and
a controller in communication with the memory, wherein the controller is configured to:
provide a logical exported capacity of the memory to a host, wherein the logical exported capacity is greater than an actual storage capacity of the memory;
receive a command from the host to write data to a logical address;
determine whether a sum of the logical address and the size of the data is greater than the logical exported capacity;
determine whether there is available actual storage capacity in the memory to write the data, when the sum is not greater than the logical exported capacity; and
write the data to a physical address in memory that corresponds to the logical address only if it is determined that there is available actual storage capacity in the memory to write the data.

2. The storage system of claim 1, wherein the controller is configured to determine whether there is available actual storage capacity in the memory by determining whether or not a storage valid count of the memory after the data is written would exceed the actual storage capacity of the memory.

3. The storage system of claim 1, wherein the controller is further configured to determine whether the command is an overwrite command, and wherein the controller is configured to determine whether there is available actual storage capacity in the memory after determining that the command is not an overwrite command.

4. The storage system of claim 1, wherein the controller is further configured to:
receive a discard command from the host; and
decrease a storage valid count of the memory in response to the discard command.

5. The storage system of claim 1, wherein the data is part of a stream.

6. The storage system of claim 1, wherein the memory comprises a three-dimensional memory.

7. The storage system of claim 1, wherein the storage system is embedded in the host.

8. The storage system of claim 1, wherein the storage system is removably connected to the host.

9. A method of writing data to a thin-provisioned storage system, the method comprising:
performing the following in a host in communication with a storage system, wherein the storage system comprises a memory and wherein a logical capacity of the memory exported to the host is greater than an actual storage capacity of the memory:
determining whether a sum of a logical address and a size of data to be written to the logical address is greater than the logical exported capacity;
in response to determining that the sum is not greater than the logical exported capacity, determining whether a valid data size of the memory would be greater than the actual storage capacity of the memory; and
in response to determining that the valid data size of the memory would not be greater than the actual storage capacity of the memory, sending a command to the storage system to write the data to the available logical address.

10. The method of claim 9, wherein the storage system tracks the valid data size of the memory, and wherein the method further comprises receiving the valid data size of the memory from the storage system.

11. The method of claim 9 further comprising tracking the valid data size of the memory of the storage system.

12. The method of claim 9 further comprising determining whether the command is an overwrite command, and wherein determining whether the valid data size of the memory would be greater than the actual storage capacity of the memory is performed in response to the command not being an overwrite command.

13. The method of claim 9 further comprising decreasing a valid data size of the memory in response to a discard command.

14. The method of claim 9, wherein the data is part of a stream.

15. The method of claim 9, wherein the memory in the storage system comprises a three-dimensional memory.

16. The method of claim 9, wherein the storage system is embedded in the host.

17. The method of claim 9, wherein the storage system is removably connected to the host.

18. A storage system comprising:
a memory;
means for providing a logical exported capacity of the memory to a host, wherein the logical exported capacity is greater than an actual storage capacity of the memory;
means for receiving a command from the host to write data to a logical address;
means for determining whether a sum of the logical address and size of the data is greater than the logical exported capacity;
means for determining whether there is available actual storage capacity in the memory to write the data after determining that the sum is not greater than the logical exported capacity; and
means for writing the data to a physical address in memory that corresponds to the logical address only if it is determined that there is available actual storage capacity in the memory to write the data.

19. The storage system of claim 18, wherein the memory comprises a three-dimensional memory.

* * * * *